US008898035B2

(12) United States Patent
Krzanowski

(10) Patent No.: US 8,898,035 B2
(45) Date of Patent: *Nov. 25, 2014

(54) IDENTIFYING CAUSES OF SERVICE LEVEL AGREEMENT AND PERFORMANCE VIOLATIONS

(75) Inventor: Roman Krzanowski, White Plains, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 89 days.

This patent is subject to a terminal disclaimer.

(21) Appl. No.: 13/368,033

(22) Filed: Feb. 7, 2012

(65) Prior Publication Data

US 2012/0136615 A1 May 31, 2012

Related U.S. Application Data

(63) Continuation of application No. 12/190,749, filed on Aug. 13, 2008, now Pat. No. 8,121,816.

(51) Int. Cl.
| | |
|---|---|
| *G06F 11/30* | (2006.01) |
| *G21C 17/00* | (2006.01) |
| *H04L 12/26* | (2006.01) |
| *G06F 11/34* | (2006.01) |
| *H04L 12/24* | (2006.01) |

(52) U.S. Cl.
CPC ........ *H04L 43/0829* (2013.01); *G06F 11/3409* (2013.01); *H04L 41/5003* (2013.01); *H04L 41/5009* (2013.01); *H04L 41/5035* (2013.01); *H04L 43/0852* (2013.01); *H04L 43/087* (2013.01); *H04L 43/0894* (2013.01)
USPC .......................................... 702/182; 702/185

(58) Field of Classification Search
CPC ............ H04L 41/5009; H04L 41/5003; G06F 11/3409; G06F 11/3447
USPC .................................................. 702/182, 185
See application file for complete search history.

(56) References Cited

U.S. PATENT DOCUMENTS

| 8,121,816 | B2 * | 2/2012 | Krzanowski .................. 702/182 |
|---|---|---|---|
| 2004/0078493 | A1 * | 4/2004 | Blumrich et al. .............. 709/250 |
| 2006/0176824 | A1 * | 8/2006 | Laver et al. .................... 370/241 |
| 2008/0052394 | A1 * | 2/2008 | Bugenhagen et al. ........ 709/224 |
| 2008/0279183 | A1 * | 11/2008 | Wiley et al. .................... 370/389 |
| 2009/0086639 | A1 * | 4/2009 | Krzanowski et al. ......... 370/241 |

OTHER PUBLICATIONS

Definition of Virtual Channel, ExpertGlossary, printed on Dec. 12, 2012.*

* cited by examiner

*Primary Examiner* — Michael Nghiem

(57) ABSTRACT

A computer-implemented method may include measuring a performance of a virtual channel carrying packets through a transport network for a time period, measuring a performance of an ingress interface to the transport network carrying the virtual channel packets for the time period, and measuring a performance of an internal interface carrying the virtual channel packets internal to the transport network for the time period. The computer-implemented method may determine that the performance of the virtual channel during the time period does not meet a first performance standard, and, when the performance of the virtual channel does not meet the first performance standard, may automatically determine whether the performance of the ingress interface meets a second performance standard and whether the performance of the internal interface meets a third performance standard.

20 Claims, 13 Drawing Sheets

100

VIRTUAL CHANNEL PERFORMANCE TABLE 400

| VIRTUAL CHANNEL 402 | TIME PERIOD 404 | LATENCY 406 | PACKET LOSS 408 | JITTER 410 |
|---|---|---|---|---|
| VC 106 | T1 | L1 | PL1 | J1 |
| VC 106 | T2 | L2 | PL2 | J2 |
| VC 106 | T3 | L3 | PL3 | J3 |
| VC 106 | T4 | L4 | PL4 | J4 |

INGRESS INTERFACE PERFORMANCE TABLE 500

| VIRTUAL CHANNEL 502 | TIME PERIOD 504 | FIRST INGRESS INTERFACE PACKET LOSS 506 | SECOND INGRESS INTERFACE PACKET LOSS 508 |
|---|---|---|---|
| VC 106 | T1 | PLA1 | PLB1 |
| VC 106 | T2 | PLA2 | PLB2 |
| VC 106 | T3 | PLA3 | PLB3 |
| VC 106 | T4 | PLA4 | PLB4 |

INTERNAL INTERFACE PERFORMANCE TABLE 600

| VIRTUAL CHANNEL 602 | TIME PERIOD 604 | FIRST INTERNAL INTERFACE PACKET LOSS 606 |
|---|---|---|
| VC 106 | T1 | PL11 |
| VC 106 | T2 | PL12 |
| VC 106 | T3 | PL13 |
| VC 106 | T4 | PL14 |

| NTH INTERNAL INTERFACE PACKET LOSS 608 |
|---|
| PLN1 |
| PLN2 |
| PLN3 |
| PLN4 |

FIG. 6

COMBINED PERFORMANCE TABLE 700

| VIRTUAL CHANNEL 702 | TIME PERIOD 704 | VIRTUAL CHANNEL PERFORMANCE 706 | INGRESS INTERFACE PERFORMANCE 708 | INTERNAL INTERFACE PERFORMANCE 710 |
|---|---|---|---|---|
| VC 106 | T1 | L1, PL1, J1 | PLA1, PLB1 | PL11...PLN1 |
| VC 106 | T2 | L2, PL2, J2 | PLA2, PLB2 | PL12...PLN2 |
| VC 106 | T3 | L3, PL3, J3 | PLA3, PLB3 | PL13...PLN3 |
| VC 106 | T4 | L4, PL4, J4 | PLA4, PLB4 | PL14...PLN4 |

FIG. 7

| PERFORMANCE CRITERIA TABLE 800 | | | |
|---|---|---|---|
| VIRTUAL CHANNEL 802 | VIRTUAL CHANNEL PERFORMANCE CRITERIA 806 | INGRESS INTERFACE PERFORMANCE CRITERIA 808 | INTERNAL INTERFACE PERFORMANCE CRITERIA 810 |
| VC 106 | L', PL', J' | PLA', PLB' | PL1'...PLN' |
| VC X | L', PL', J' | PLA', PLB' | PL1'...PLN' |

COMBINED PERFORMANCE TABLE 700

| VIRTUAL CHANNEL 402 | TIME PERIOD 404 | VIRTUAL CHANNEL PERFORMANCE 406 | INGRESS INTERFACE PERFORMANCE 408 | INTERNAL INTERFACE PERFORMANCE 410 |
|---|---|---|---|---|
| VC 106 | T1 | L1, PL1, J1 | PLA1, PLB1 | PL11...PLN1 |
| VC 106 | T2 | L2, (PL2), J2 | PLA2, (PLB2) | PL12...PLN2 |
| VC 106 | T3 | L3, (PL3), J3 | PLA3, PLB3 | (PL13)...PLN3 |
| VC 106 | T4 | L4, (PL4), J4 | (PLA4), PLB4 | PL14...(PLN4) |

| PERFORMANCE REPORT 1100A – TRANSPORT NETWORK FAULT | | | |
|---|---|---|---|
| VIRTUAL CHANNEL | TIME PERIOD | VIRTUAL CHANNEL PERFORMANCE | INTERNAL INTERFACE PERFORMANCE |
| VC 106 | T3 | PL3 | PL13 |

| PERFORMANCE REPORT 1100B – CUSTOMER PREMISE EQUIPMENT FAULT | | | |
|---|---|---|---|
| VIRTUAL CHANNEL | TIME PERIOD | VIRTUAL CHANNEL PERFORMANCE | INGRESS INTERFACE PERFORMANCE |
| VC 106 | T2 | PL2 | PLB2 |

PERFORMANCE REPORT 1100C – UNKNOWN FAULT

| VIRTUAL CHANNEL | TIME PERIOD | VIRTUAL CHANNEL PERFORMANCE | INGRESS INTERFACE PERFORMANCE | INTERNAL INTERFACE PERFORMANCE |
|---|---|---|---|---|
| VC 106 | T4 | PL4 | PLA4 | PLN4 |

IDENTIFYING CAUSES OF SERVICE LEVEL AGREEMENT AND PERFORMANCE VIOLATIONS

This application is a continuation of U.S. patent application Ser. No. 12/190,749, filed Aug. 13, 2008, now U.S. Pat. No. 8,121,816, issued Feb. 21, 2012, which is hereby incorporated by reference.

BACKGROUND INFORMATION

Network service providers may own and operate networks and may sell virtual channels (e.g., virtual networks) as a service to customers. For example, a business customer may rent a virtual channel from a network service provider in order to connect two remote offices for the exchange of data between the two offices. The network service provider may guarantee a level of performance for the virtual channel to the customer. The level of performance may be measured by latency, packet loss, and/or jitter, among other things. In addition, the customer may agree not to exceed, and the service provider may agree to provide, a certain data rate (e.g., measured in bits per second) over the virtual channel. The level of performance guaranteed by the service provider and the data rate requirements may be documented in a service level agreement (SLA) between the service provider and the customer.

BRIEF DESCRIPTION OF THE DRAWINGS

FIG. 4 is a block diagram of an exemplary virtual channel performance table;

FIG. 5 is a block diagram of an exemplary ingress interface performance table;

FIG. 6 is a block diagram of an exemplary internal interface performance table;

FIG. 7 is a block diagram of an exemplary combined performance table;

FIG. 8 is a block diagram of an exemplary performance criteria table;

FIG. 10 is a block diagram of the exemplary combined performance table of FIG. 7 with performance violations highlighted; and FIGS. 11A, 11B, and 11C are a block diagram of exemplary performance reports for virtual channel characteristics.

DETAILED DESCRIPTION OF PREFERRED EMBODIMENTS

Figure 1:
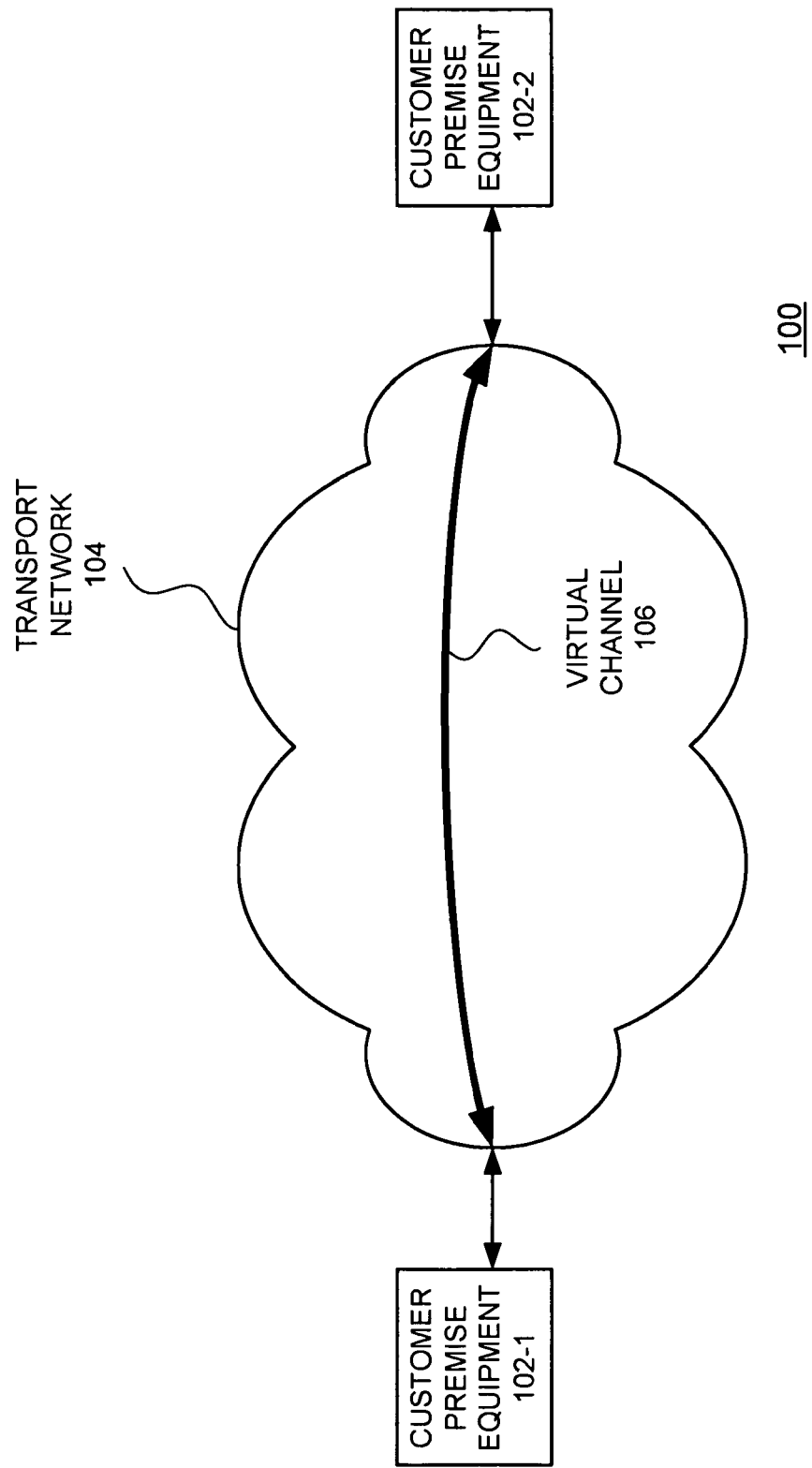
FIG. 1 is a block diagram of an exemplary network in which systems and methods, consistent with one or more embodiments, may be implemented.

The following detailed description refers to the accompanying drawings. The same reference numbers in different drawings may identify the same or similar elements. Also, the following detailed description does not limit the invention.

One or more embodiments disclosed herein may allow for the automatic determination of when a virtual channel in a transport network does not meet one or more performance criteria. One or more embodiments disclosed herein may also determine whether transport network equipment (e.g., a service provider) or end-point equipment (e.g., a customer) is at fault for the lack of performance of the virtual channel in the transport network.

As disclosed herein, a computer-implemented method comprises: measuring a performance of a virtual channel carrying packets through a transport network, wherein the packets originate from end-point equipment not forming part of the transport network; measuring a performance of an ingress interface to the transport network receiving the virtual channel packets; measuring a performance of an internal interface carrying the virtual channel packets internal to the transport network; determining whether the performance of the virtual channel meets a first performance criterion; determining whether the performance of the ingress interface meets a second performance criterion; determining whether the performance of the internal interface meets a third performance criterion; and identifying instances where the performance of the virtual channel has been determined not to meet the first performance criterion, and the performance of the ingress interface has been determined not to meet the second performance criterion as performance violations caused by the end-point equipment. The computer-implemented method further comprises: identifying instances where the performance of the virtual channel has been determined not to meet the first performance criterion and the performance of the internal interface has been determined not to meet the third performance criterion as performance violations caused by the transport network.

As disclosed herein, a system comprises: network devices forming a transport network for carrying packets through a virtual channel, wherein one of the network devices includes an ingress interface to receive the packets from end-point equipment coupled to the transport network, and wherein one of the network devices includes an internal interface to receive the packets from another one of the network devices forming part of the transport network; a transmitter to inject packets into the virtual channel to measure a performance of the virtual channel; a receiver to receive the injected packets from the virtual channel to measure the performance of the virtual channel; and a processor to: measure the performance of the virtual channel, a performance of the ingress interface, and a performance of the internal interface; determine whether the performance of the virtual channel meets a first criterion, whether the performance of the ingress interface meets a second criterion, and whether the performance of the internal interface meets a third criterion; and identify instances where the performance of the virtual channel has been determined not to meet the first performance criterion, and the performance of the internal interface has been determined not to meet the third criterion as performance violations caused by the transport network. The processor is configured to identify instances where the performance of the virtual channel has been determined not to meet the first performance criterion, and the performance of the ingress interface has been determined not to meet the second performance criterion as performance violations caused by the end-point equipment.

As disclosed herein, a computer-implemented method comprises: transporting packets through a transport network via a virtual channel, wherein the packets originate from end-point equipment not forming part of the transport network; measuring a performance of an ingress interface to the transport network receiving the packets during a plurality of time periods; measuring a performance of an internal interface to the transport network carrying the packets internal to the transport network during the plurality of time periods;

determining whether the performance of the ingress interface meets a first performance criterion during the plurality of time periods; determining whether the performance of the internal interface meets a second performance criterion during the plurality of time periods; identifying one or more of the plurality of time periods in which the performance of the ingress interface has been determined not to meet the first performance criterion as time periods in which a virtual channel performance violation is caused by the end-point equipment; and identifying one or more of the plurality of time periods in which the internal interface has been determined not to meet the second performance criterion as time periods in which a virtual channel performance violation is caused by the transport network.

FIG. 1 is a block diagram of an exemplary network 100 in which systems and methods, consistent with exemplary embodiments, may be implemented. As illustrated, network 100 may include a first piece of customer premise equipment (CPE) 102-1 and a second piece of CPE 102-2 (collectively "CPE 102"), a transport network 104, and a virtual channel (VC) 106. As shown in FIG. 1, CPE 102-1 may communicate with CPE 102-2 through transport network 104 using VC 106, for example.

In one exemplary embodiment, a network service provider may own and operate transport network 104 and may sell VC 106 as a service to a customer, such as a customer that owns CPE 102. In this example, CPE 102-1 may be in the customer's home office and CPE 102-2 may be in the customer's remote office. The customer may user VC 106 for communications between these two offices. In alternative embodiments, transport network 104 and CPE 102 may be owned and operated by the same entity.

The network service provider may guarantee a level of performance for VC 106 to the customer. The level of performance may be measured by latency, packet loss, and/or jitter, among other things. In addition, the customer may agree not to exceed, and the service provider may agree to provide, a certain data rate for data passing through VC 106. The level of performance guaranteed by the service provider and the data rate requirements may be documented in a service level agreement (SLA). If the level of performance is not met, the service provider and the customer may want to know the reason, which could be the fault of equipment in transport network 104 (e.g., the service provider) or the fault of CPE 102 (e.g., the customer). Embodiments disclosed herein may automatically detect when the level of performance of a virtual channel is not met and, when it is not met, may determine whether transport network 104 (e.g., the service provider) or CPE 102 (e.g., the customer) is at fault.

CPE 102 may include any device or combination of devices that may communicate over VC 106. For example, CPE 102 may include any combination of personal computers, laptops, or another type of computation or communication device. CPE 102 may also include a network device, such as a router and/or switch, which routes the data traffic (e.g., packets) for transmission over VC 106. CPE 102 may include one or more computer systems for hosting programs, databases, and/or applications.

Transport network 104 may represent a network used to route customer data traffic to/from various devices in network 100, such as CPE 102-1 and CPE 102-2. Transport network 104 may include devices, systems, and/or protocols that provide switching and/or routing of packets. For example, transport network 104 may include Multi-Protocol Label Switching (MPLS) devices, systems, and protocols. Protocols other than MPLS are possible. Transport network 104 may include virtual channels, such as VC 106, or virtual private networks.

Transport network 104 may include one or more sub-networks of any type, including a Local-Area Network (LAN), a Wide-Area Network (WAN), a satellite network, a Metropolitan-Area Network (MAN), a telephone network, such as the Public-Switched Telephone Network (PSTN) or a Public Land Mobile Network (PLMN), an ad hoc network, an intranet, the Internet, or a combination of networks. The PLMN(s) may further include a packet-switched sub-network, such as, for example, General Packet Radio Service (CPRS), Cellular Digital Packet Data (CDPD), or Mobile IP sub-network. Transport network 104 may include a high-speed fiber optic network, such as Verizon's FiOS™ network.

Figure 2:
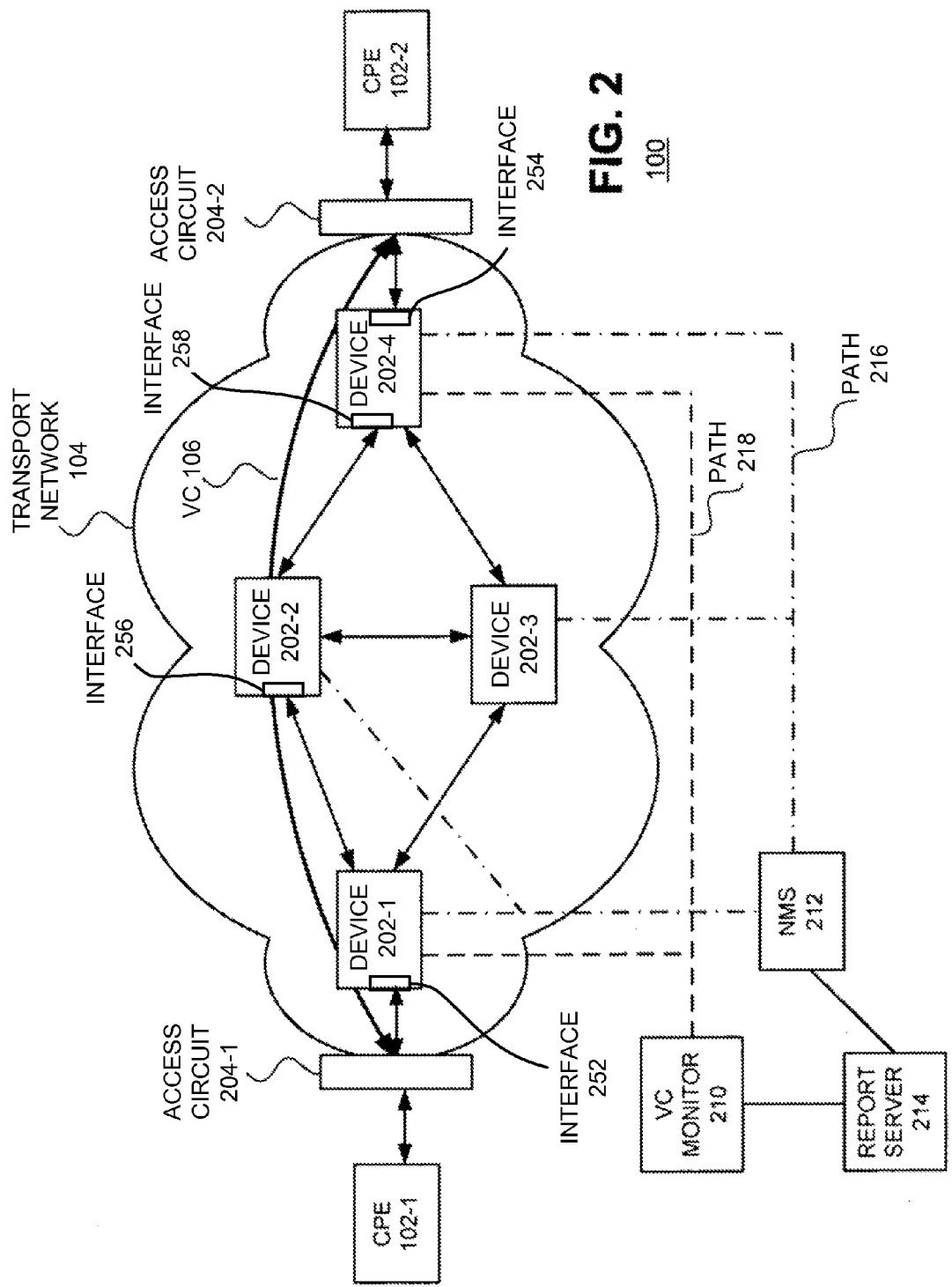
FIG. 2 is a more detailed block diagram of the exemplary network of FIG. 1 in which embodiments described herein may be implemented.

FIG. 2 is a more detailed block diagram of exemplary network 100 in which embodiments described herein may be implemented. As shown in FIG. 2, network 100 may include a network management system (NMS) 212, a VC monitor 210, and a report server 214. In addition, transport network 104 may include network devices 202-1 through 202-4 (collectively "network devices 202," individually "network device 202-x") and access circuits 204-1 and 204-2 (collectively "access circuits 204").

Network devices 202 may accept packets (e.g., on one interface) and may route packets (e.g., on another interface) toward destination devices. As used herein, the term "packet" may include any type of data unit, including a packet, cell, or datagram; a fragment of a packet, cell, or datagram; a group of packets, cells, or datagrams; or other types or arrangements of data. Network devices 202 may include switches and/or routers. Network devices 202 may also include logic circuitry and/or software to measure and/or monitor packet losses (e.g., the number of dropped packets) on interfaces.

Access circuits 204 may provide interfaces for the entry and/or exit of packets to and from transport network 104. For example, access circuits 204 may, in one embodiment, convert a packet that enters transport network 104 from a native packet into an MPLS packet by adding an MPLS header. Access circuits 204 may also convert a packet that leaves transport network 104 from an MPLS packet to a native packet, e.g., a non-MPLS packet, by stripping away its MPLS header. In one embodiment, network device 202-1 may include access circuit 204-1 and network device 202-4 may include access circuit 204-2.

As shown in FIG. 2, VC 106 may pass through network devices 202-1, 202-2, and 202-4. That is, in one direction, network device 202-1 may receive packets from access circuit 204-1 and route the packets to network device 202-2; network device 202-2 may receive packets from network device 202-1 and route the packets to network device 202-4; network device 202-4 may receive packets from network device 202-2 and route the packets to access circuit 204-2. In the other direction, network device 202-4 may receive packets from access circuit 204-2 and route the packets to network device 202-2; network device 202-2 may receive packets from network device 202-4 and route the packets to network device 202-1; network device 202-1 may receive packets from network device 202-2 and route the packets to access circuit 204-1.

VC monitor 210 may include one or more computer systems for hosting programs, databases, and/or applications. VC monitor 210 may monitor and/or measure the performance of virtual channels, such as VC 106. In one embodiment, VC monitor 210 may inject packets into a virtual channel, e.g., VC 106, to measure the performance. VC monitor 210 may measure the performance by measuring latency, packet loss, and/or jitter of the virtual channel, among other things. Latency may include the time it takes a packet to travel from a source end-point to the destination end-point of a virtual channel. Jitter may include the variation of the latency in the virtual channel over a period of time. Packet loss may include the number or percentage of packets sent from one end-point that do not arrive at the other end-point of the virtual circuit during a period of time.

In one embodiment, VC monitor 210 may communicate with network devices, such as network devices 202, at or near the end-points of virtual channels. For example, VC monitor 210 may communicate over communication path 218 with network device 202-1 (near one end point of VC 106) and network device 202-4 (near the other end-point of VC 106). VC monitor 210 may measure and/or monitor the performance of a virtual channel periodically, such as every 30 minutes, every 20 minutes, every 15 minutes, every 10 minutes, every 5 minutes, every 1 minute, every 30 seconds, every 10 seconds, every second, or every fraction of a second. VC monitor 210 may store the measured and/or monitored performance for analysis. In one exemplary embodiment, because VC monitor 210 may send packets in-band, VC monitor 210 may measure and/or monitor the performance no more frequently than every 10 minutes to minimize overhead in-band data traffic (e.g., packets).

NMS 212 may include one or more computer systems for hosting programs, databases, and/or applications. NMS 212 may measure and/or monitor the performance of network devices, such as network devices 202. In one embodiment, NMS 212 may measure and/or monitor packet losses on the different interfaces of network devices 202. In another embodiment, NMS 212 may measure and/or monitor additional or different performance characteristics, such as jitter and/or latency. As shown in FIG. 2, NMS 212 may communicate with network devices 202 through a communication path 216 to gather the performance information with respect to the interfaces of network devices 202. NMS 212 may measure and/or monitor the performance periodically, such as every 30 minutes, every 20 minutes, every 15 minutes, every 10 minutes, every 5 minutes, every 1 minute, every 30 seconds, every 10 seconds, every second, or every fraction of a second. NMS 212 may store the reported performance for analysis.

NMS 212 may, for example, monitor packet losses on "internal interfaces" and/or "ingress interfaces." An ingress interface is an interface of network device 202-x that receives packets into transport network 104. For example, the interface 252 of network device 202-1 that receives packets from access circuit 204-1 for VC 106 may be considered an ingress interface. The interface 254 of network device 202-4 that receives packets from access circuit 204-2 for VC 106 may also be considered an ingress interface. An internal interface is an interface of network device 202-x that forwards or receives packets to or from another network device in transport network 104. For example, the interface 256 of network device 202-2 that receives packets from network device 202-1 may be considered an internal interface. The interface 258 of network device 202-4 that receives packets from network device 202-2 may also be considered an internal interface. In another embodiment, NMS 212 may communicate with access circuits 204 to monitor and/or measure the performance of interfaces in access circuits 204.

Report server 214 may include one or more computer systems for hosting programs, databases, and/or applications. Report server 214 may communicate with NMS 212 and/or VC monitor 210 to combine or aggregate the performance data recorded by VC monitor 210 and/or NMS 212. Report server 214 may also analyze the recorded performance data to determine fault, for example, for a poorly performing virtual channel. Report server 214 may determine that customer equipment (e.g., CPE 102 attached or coupled to an end-point of VC 106) is generating too much data traffic (e.g., packets), which may result in the poor performance of VC 106. On the other hand, report server 214 may determine that one or more network devices 202 in transport network 104 are dropping packets, which may result in the poor performance of VC 106.

In one exemplary embodiment, CPE 102 may be owned and/or operated by a customer and be located on the customer's premises. In this exemplary embodiment, transport network 104 may be owned and operated by a service provider. In another embodiment, CPE 102 and/or transport network 104 may be owned and operated by another party or may both be owned by the same party.

In other embodiments, network 100 may include more, fewer, or different components. For example, network 100 may include additional CPE 102 or additional network devices 202. Moreover, one or more components shown in network 100 (e.g., components 102-106 and 202-214) may perform one or more functions described as being performed by another component of network 100. For example, NMS 212, VC monitor 210, and report server 214 may be combined into a single server. In addition, the functions of measuring and/or monitoring of interfaces in network devices 202 may be shared among NMS 212 and network devices 202. Although FIG. 2 shows components 102-106 and 202-214 coupled in a particular configuration, components 102-106 and 202-2.14 may also be coupled in other configurations. Furthermore, one or more of components 102-106 and 202-214 may be remotely located from each other.

Figure 3:
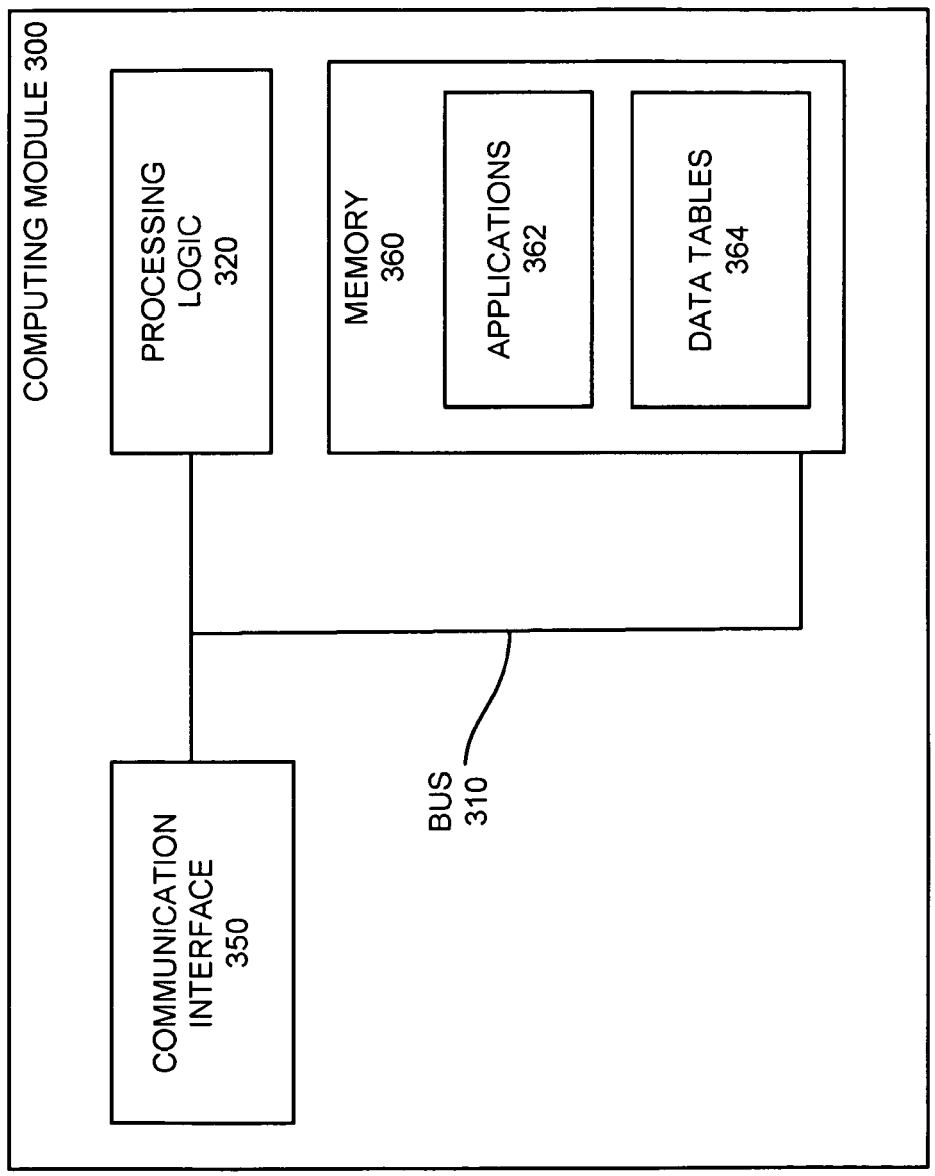
FIG. 3 is a block diagram of exemplary components of a computing module.

FIG. 3 is a block diagram of exemplary components of a computing module 300. CPE 102, access circuits 104, network devices 202, NMS 212, VC monitor 210, and report server 214 may each include one or more (e.g., a rack of) computing modules, such as module 300. Module 300 may include a bus 310, processing logic 320, a communication interface 350, and a memory 360. Module 300 may include other components (not shown) that aid in receiving, transmitting, and/or processing data. Moreover, other configurations of components in module 300 are possible.

Bus 310 may include a path that permits communication among the components of module 300. Processing logic 320 may include any type of processor or microprocessor (or groups of processors or microprocessors) that interprets and executes instructions. In other embodiments, processing logic 320 may include an application-specific integrated circuit (ASIC), a field-programmable gate array (FPGA), or the like.

Communication interface 350 may include any transceiver-like mechanism that enables module 300 to communicate with other devices and/or systems. Communications interface 350 may include a network interface card, e.g., Ethernet card, for wired communications or a WiFi card for wireless communications. Communication interface 350 may include a transmitter that may convert baseband signals from processing logic 320 to radio frequency (RE) signals and/or a receiver that may convert RF signals to baseband signals.

Memory 360 may include a random access memory (RAM) or another type of dynamic or static storage device that may store information and instructions, e.g., an application, for execution by processing logic 320; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions. Memory 360 may include one or more applications 362 and one or more data tables 364.

In the case of NMS 212, applications 362 may include, for example, an application for NMS 212 to measure, monitor, and record performance characteristics, such as packet loss, for the interfaces of network devices 202 for a group of time periods. In this case, data tables 364 may include, for example, a data table that stores the performance measurements, such as packet loss, for the interfaces of network devices 202.

In the case of VC monitor 210, applications 362 may include, for example, an application for VC monitor 210 to measure, monitor, and record performance characteristics, such as latency, packet loss, and/or jitter, for virtual channels for a group of time periods. In this case, data tables 364 may include a table that stores the performance measurements, such as latency, packet loss, and/or jitter for virtual channels for the time periods.

In the case of report server 214, applications 362 may include, for example, an application for report server 214 to combine and analyze the performance measurements stored in VC monitor 210 and/or NMS 212. In this case, data tables 364 may include a table that stores the combined performance measurements.

Module 300 may perform certain operations, as described below. Module 300 may perform these operations in response to processing logic 320 executing software instructions (e.g., one or more applications 362) stored in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processing logic 320 to perform processes that are described below.

FIG. 4 is a block diagram of an exemplary VC performance table 400. VC performance table 400 may store the performance measurements taken by VC monitor 210. As such, VC performance table 400 may be stored in VC monitor 210 (e.g., in memory 360 as data table 364). In another embodiment, VC performance table 400 may be stored in another component of network 100, such as NMS 212 and/or report server 214.

VC performance table 400 may include a VC field 402, a time period field 404, a latency field 406, a packet loss field 408, and a jitter field 410. VC performance table 400 may include additional, different, or fewer fields than illustrated in FIG. 4.

VC field 402 may store information identifying a virtual channel for which the data in fields 404-410 correspond. In exemplary VC performance table 400, VC field 402 indicates that the data in fields 404-410 all correspond to VC 106. Other virtual channels are possible.

Time period field 404 may store information identifying a time period for which the performance measurements in fields 406-410 correspond. As shown in VC performance table 400, four time periods are listed, e.g., periods T1 through T4. In the exemplary embodiment descried below, time periods T1 through T4 may be different periods of time of any duration. In another embodiment, time periods T1 through T4 may be consecutive time periods. In yet another embodiment, time periods T1 through T4 may not be consecutive (e.g., there may be time gaps between the time periods). Time period field 404 may store a start and an end time (e.g., month, day, year, time of day) of the time period.

Latency field 406 may store the measured latency during the time period identified in field 404 for the virtual channel identified in field 402. As shown in FIG. 4, four latency measurements L1 through L4 correspond to the four time periods T1 through T4, respectively. Latency may be measured and stored in milliseconds, for example.

Packet loss field 408 may store the measured packet loss during the time period identified in field 404 for the virtual channel identified in field 402. As shown in FIG. 4, four packet loss measurements PL1 through PL4 correspond to the four time periods T1 through T4, respectively. Packet loss may be measured and stored as the number of packets lost per hundred packets sent, for example, or as a percentage.

Jitter field 410 may store the measured jitter during the time period identified in field 404 for the virtual channel identified in field 402. As shown in FIG. 4, four jitter measurements J1 through J4 correspond to the four time periods T1 through T4, respectively. Jitter may be measured and stored in milliseconds, for example.

For simplicity, the latency measurements in VC performance table 400 are shown with labels L1 through L4; the packet loss measurements are shown with labels PL1 through PL4; the jitter measurements are shown with labels J1 through J4; and the time periods are shown with labels T1 through T4. In other implementations, the raw values may be stored in VC performance table 400.

FIG. 5 is a block diagram of an exemplary ingress interface (IF) performance table 500. Ingress IF performance table 500 may store the performance measurements taken by NMS 212. As such, ingress IF performance table 500 may be stored in NMS 212 (e.g., in memory 360 as data table 364). In another embodiment, ingress IF performance table 500 may be stored in another component of network 100, such as VC monitor 210 and/or report server 214.

Ingress IF performance table 500 may include a VC field 502, a time period field 504, a first ingress IF packet loss field 506, and a second ingress IF packet loss field 508.

VC field 502 may store information identifying a virtual channel for which the data in fields 504-508 correspond. As shown in ingress IF performance table 500, VC field 502 indicates that the data in fields 504-508 all correspond to VC 106. Other virtual channels are possible.

Time period field 504 may store information identifying a time period for which the performance measurements in field 506 and 508 correspond. As shown in FIG. 5, four time periods are listed, e.g., periods T1 through. T4. The time periods (e.g., T1 through T4) stored in ingress IF performance table 500, thus, may correspond to the time periods stored in VC performance table 400. In one embodiment, time period field 404 may store a start and an end time (e.g., month, day, year, time of day) of the time period.

First ingress IF packet loss field 506 may store the measured packet loss for a first ingress interface during the time period identified in field 504 for the virtual channel identified in field 502. For example, two ingress interfaces may carry packets through VC 106—one for each direction through transport network 104. In the example of FIG. 2, a first ingress interface (e.g., in network device 202-1) may receive packets from access circuit 204-1 from CPE 102-1 for VC 106. As shown in FIG. 5, four packet loss measurements PLA1 through PLA4 may correspond to the four time periods T1 through T4, respectively. Packet loss in field 506 may be measured and stored as the number of packets lost per hundred packets sent, for example, or as a percentage.

Second ingress IF packet loss field 508 may store the measured packet loss for a second ingress interface during the time period identified in field 504 for the virtual channel identified in field 502. In the example of FIG. 2, a second ingress interface (e.g., in network device 202-4) may receive packets from access circuit 204-2 from CPE 102-2 for VC 106. As shown in FIG. 5, four packet loss measurements PLB1 through PLB4 correspond to the four time periods T1 through T4, respectively. Packet loss in field 508 may be measured and stored as the number of packets lost per hundred packets sent, for example, or as a percentage.

Ingress IF performance table 500 may include additional, different, or fewer fields than illustrated in FIG. 5. For example, ingress IF performance table 500 may include additional ingress packet loss fields when a virtual channel includes more than two ingress interfaces, e.g., when the virtual channel is multi-point to multi-point. In one embodiment, ingress IF performance table 500 may include only one ingress packet loss field for a unidirectional virtual channel.

For simplicity, the packet loss measurements of a first ingress interface in ingress IF performance table 500 are shown with labels PLA1 through PLA4, the packet loss measurements of a second ingress interface are shown with labels PLB1 through PLB4, and the time periods are shown with labels T1 through T4. In other implementations, the raw values may be stored in ingress IF performance table 500.

FIG. 6 is a block diagram of an exemplary internal IF performance table 600. Internal IF performance table 600 may store the performance measurements taken by NMS 212. As such, internal IF performance table 600 may be stored in NMS 212 (e.g., in memory 360 as data table 364). In another embodiment, internal IF performance table 600 may be stored in another component of network 100, such as VC monitor 210 and/or report server 214.

Internal IF performance table 600 may include a VC field 602 and a time period field 604. Internal IF performance table 600 may also include a first internal IF packet loss field 606 through an Nth internal IF packet loss field 608, where N is a positive integer. In other words, there may be many (e.g., N) packet loss fields, one field corresponding to each of the internal interfaces carrying packets for a virtual channel through transport network 104. Internal IF performance table 600 may include additional, different, or fewer fields than illustrated in FIG. 6.

VC field 602 may store information identifying a virtual channel for which the data in fields 604-608 correspond. As shown in internal IF performance table 600, VC field 602 indicates that the data in fields 604-608 all correspond to VC 106. Other virtual channels are possible.

Time period field 604 may store information identifying a time period for which the performance measurements correspond. As shown in FIG. 6, four time periods are listed, e.g., periods T1 through T4. The time periods (e.g., T1 through T4) stored in internal IF performance table 600, thus, may correspond to the time periods stored in VC performance table 400 and ingress IF performance table 500. In one embodiment, time period field 604 may store a start and an end time (e.g., month, day, year, time of day) of the time period.

First internal IF packet loss field 606 may store the measured packet loss for a first internal interface during the time period identified in field 604 for the virtual channel identified in field 602. For example, many internal interfaces (e.g., N) may carry VC 106 through transport network 104. In the example of FIG. 2, a first internal interface (e.g., in network device 202-2) may receive packets from network device 202-1 for VC 106. As shown in FIG. 6, four packet loss measurements PL11 through PL14 correspond to the four time periods T1 through T4, respectively. Packet loss in field 606 may be measured and stored as the number of packets lost per hundred packets sent, for example, or as a percentage.

Nth internal IF packet loss field 608 may store the measured packet loss for the Nth internal interface during the time period identified in field 604 for the virtual channel identified in field 602. In the example of FIG. 2, an Nth internal interface (e.g., in network device 202-4) may receive packets from network device 202-2 for VC 106. As shown in FIG. 6, four packet loss measurements PLN1 through PLN4 correspond to the four time periods T1 through T4, respectively. Packet loss in field 608 may be measured and stored as the number of packets lost per hundred packets sent, for example, or as a percentage.

For simplicity, the packet loss measurements of a first internal interface in internal IF performance table 600 are shown with labels PL11 through PL14; the packet loss measurements of an Nth internal interface are shown with labels PLN1 through PLN4, and the time periods are shown with labels T1 through T4. In other implementations, the raw measurement values may be stored in internal IF performance table 600.

FIG. 7 is a block diagram of an exemplary combined performance table 700. Combined performance table 700 may store the performance measurements stored in VC performance table 400, ingress IF performance table 500, and internal IF performance table 600. Combined performance table 700 may be stored in report server 214 (e.g., in memory 360 as data table 364). In another embodiment, internal IF performance table 600 may be stored in another component of network 100, such as VC monitor 210 and/or NMS 212.

Combined performance table 700 may include a VC field 702, a time period field 704, a VC performance field 706, an ingress IF performance field 708, and an internal IF performance field 710.

VC field 702 may store information identifying a virtual channel for which the data in fields 704-708 correspond. As shown in combined performance table 700, VC field 702 indicates that the data in fields 604-608 all correspond to VC 106. Other virtual channels are possible.

Time period field 704 may store information identifying a time period for which the performance measurements correspond. As shown in FIG. 7, four time periods are listed, e.g., periods T1 through T4. The time periods (e.g., T1 through T4) stored in combined performance table 700, thus, may correspond to the time periods stored in VC performance table 400, ingress IF performance table 500, and ingress IF performance table 600. In one embodiment, time period field 704 may store a start and an end time (e.g., month, day, year, time of day) of the time period.

VC performance field 706 may include the performance measurements from fields 406 through 410 of VC performance table 400 that correspond to the time period stored in field 704 and the virtual channel stored in field 702.

Ingress IF performance field 708 may include the performance measurements from fields 506 and 508 of ingress IF performance table 500 that correspond to the time period stored in field 704 and the virtual channel stored in field 702.

Internal IF performance field 710 may include the performance measurements from fields 606 and 608 of internal IF performance table 600 that correspond to the time period stored in field 704 and the virtual channel stored in field 702.

As shown in FIG. 7, exemplary combined performance table 700 may include the data stored in VC performance table 400, ingress IF performance table 500, and internal IF performance table 600.

Combined performance table 700 may include additional, different, or fewer fields than illustrated in FIG. 7. For example, VC performance field 706 may include separate fields similar to fields 406 through 410 of VC performance table 400; ingress interface performance fields 708 may include separate fields similar to fields 506 and 508 of ingress IF performance table 500; and internal IF performance field 710 may include separate fields similar to fields 606 and 608 in internal IF performance table 600.

FIG. 8 is a block diagram of an exemplary performance criteria (e.g., standard) table 800. Performance criteria table 800 may store the performance criteria that a virtual channel and a transport network should meet. In other words, the measured performances stored in combined performance table 700 may be compared to the criteria in performance criteria table 800 to determine, for example, whether a virtual channel is meeting performance requirements. Performance criteria table 800 may be stored in report server 214 (e.g., in memory 360 as data table 364). In another embodiment, internal performance criteria table 800 may be stored in another component of network 100, such as VC monitor 210 and/or NMS 212.

Performance criteria table 800 may include a VC field 802, a VC performance criteria field 806, an ingress IF performance field criteria 808, and an internal IF performance criteria field 810.

VC field 802 may store information identifying a virtual channel for which the criteria in fields 806 through 810 correspond. As shown in performance criteria table 800, VC field 802 indicates that the criteria stored in fields 806-810 are for two virtual channels, e.g., VC 106 and VC X. Other virtual channels are possible.

VC performance criteria field 806 may include the performance criteria, from the perspective of VC monitor 210, that the virtual channel identified in VC field 802 may be required to meet. The criteria stored in VC performance criteria field 806 may, in one embodiment, be derived from an SLA negotiated between a customer and a service provider. For example, an SLA may require that a virtual channel, such as VC 106, be able to deliver packets with a latency less than L', a packet loss less than PL', and a jitter less than J'. As such, L', PL', J' and may be recorded in performance criteria table 800 as the maximum latency, the maximum packet loss, and the maximum jitter in field 806 for VC 106. The criteria in VC performance criteria field 806 may be compared, for example, to the measured performance stored in VC performance field 706 of combined performance table 700.

Ingress IF performance criteria field 808 may include the performance criteria, from the perspective of NMS 212, that the ingress interfaces for the virtual channel identified in VC field 802 may be required to meet. The criteria stored in ingress IF performance criteria field 806 may, in one embodiment, be derived from an SLA negotiated between a customer and a service provider. For example, an SLA may require that the virtual channel, such as VC 106, be able to transport packets at a rate of R mega bits per second (mbps), e.g., 10 mbps, in each direction. As such, the maximum rate R may correspond to a maximum packet loss of PLA= and PLB' at ingress interfaces for VC 106 and PLA' and PLB' may be recorded in ingress IF performance criteria field 808 for VC 106. The criteria in field 808 may be compared, for example, to the measured performance stored in field 708 of combined performance table 700.

Internal IF performance criteria field 810 may include the performance criteria, from the perspective of NMS 212, that the interfaces carrying the virtual channel identified in VC field 802 may be required to meet. The criteria stored in internal IF performance criteria field 810 may be derived from the known maximum capacity of the network devices, such as network devices 202. For example, it may be known that the N internal interfaces for VC 106 should not experience a packet loss of greater than PL1' through PLN'. As such the packet losses PL1' through PLN' may be recorded in internal IF performance criteria field 810 for VC 106. The criteria in field 810 may be compared, for example, to the measured performance stored in field 710 of combined performance table 700.

Performance criteria table 800 may include additional, different, or fewer fields than illustrated in FIG. 8. For example, VC performance criteria field 806 may include separate criteria fields corresponding to fields 406 through 410 of VC performance table 400; ingress IF performance criteria fields 808 may include separate criteria fields similar to fields 506 and 508 of ingress IF performance table 500; and internal IF performance criteria field 810 may include separate criteria fields similar to fields 606 and 608 in internal IF performance table 600.

Figure 9:
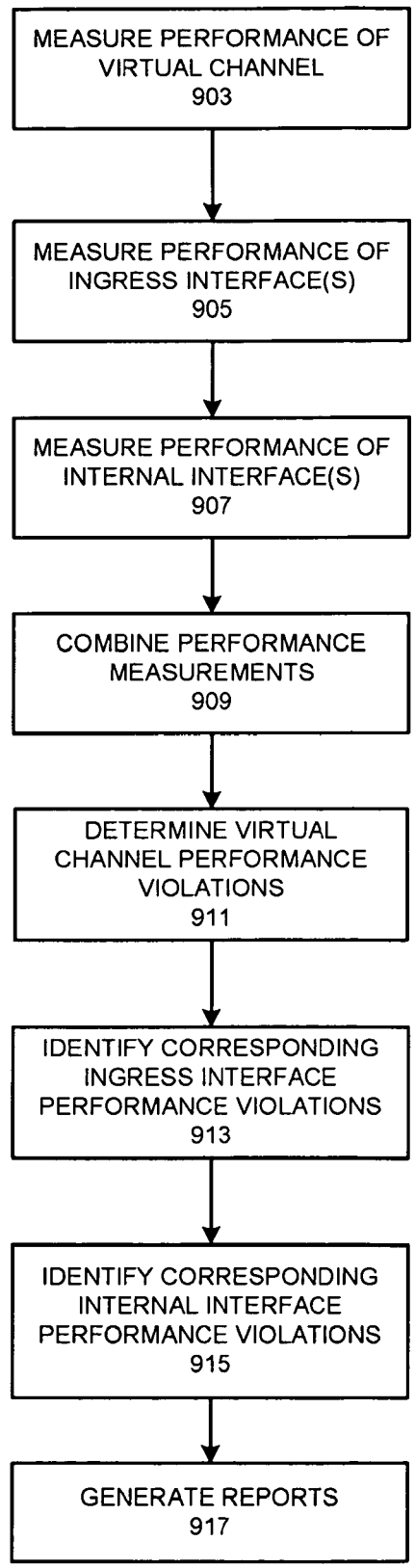
FIG. 9 is a flowchart of an exemplary process for identifying performance violations.

FIG. 9 is a flowchart of an exemplary process 900 for identifying virtual channel performance violations and assigning fault for virtual channel performance violations. Process 900 may be executed in another component in network 100, such as in VC monitor 210, NMS 212, and/or report server 214, for example, alone or in a distributed manner.

The performance of a virtual channel may be measured (block 903). For example, VC monitor 210 may measure the performance of VC 106 through transport network 104. The measurements may include measurements of latency, packet loss, and/or jitter, for example, among other things. VC monitor 210 may record the measurements in VC performance table 400 for a group of time periods (e.g., T1 to T4) for each virtual channel being monitored, such as VC 106. In one embodiment descried below, time periods T1 through T4 may be different periods of time of any duration. In another embodiment, time periods T1 through T4 may be consecutive time periods. In yet another embodiment, time periods T1 through T4 may not be consecutive (e.g., there may be time gaps between the time periods).

The performance of one or more ingress interfaces may be measured (block 905). For example, NMS 212 may measure and/or monitor the performance of ingress interfaces to transport network 104 that carry packets for VC 106. In this example, NMS 212 may measure the performance of the interface of network device 202-1 that receives packets from access circuit 204-1 for VC 106. NMS 212 may also measure the performance of the interface of network device 202-4 that receives packets from access circuit 204-2 for VC 106. The measurements may include measurements of packet loss, among other things, for example. NMS 212 may record the measurements in ingress IF performance table 500 for time periods (e.g., T1 to T4) for each virtual channel being monitored, such as VC 106.

The performance of one or more internal interfaces may be measured (block 907). For example, NMS 212 may measure and/or monitor the performance of internal interfaces in transport network 104 that carry packets for VC 106. In this example, NMS 212 may measure and/or monitor the performance of the interface in network device 202-2 that receives packets from network device 202-1 for VC 106. NMS 212 may also measure the performance of the interface in network device 202-4 that may receive packets from network device 202-2 for VC 106. The measurements may include measurements of packet loss, among other things, for example. NMS 212 may record the measurements in internal IF performance table 600 for time periods (e.g., T1 through T4) for each virtual channel being monitored, such as VC 106.

The performance measurements may be combined (block 909). Report server 214 may receive a VC performance table from VC monitor 210, and an ingress IF performance table and an internal IF performance table from NMS 212. Report server 214 may combine the different performance tables into a combined performance table, such as combined performance table 700. Report server 214 may store data in combined performance table 700 by virtual channel and by time period, such that report server 214 may analyze a "snapshot" of any virtual channel (e.g., VC 106) at any period of time (e.g., T1, T2, T3, or T4).

Virtual channel performance violations may be determined (block 911). Report server 214 may identify instances where a virtual channel did not meet performance criteria set for that virtual channel. To identify these instances, report server 214 may compare the measured performance stored in VC performance field 706 of combined performance table 700 with the performance criteria stored in VC performance criteria field 806 of performance criteria table 800. Although a virtual channel may not meet performance criteria, the virtual channel may still function, but not up to the performance criteria. Examples of the identification of violations are illustrated in FIG. 10.

FIG. 10 is a block diagram of the exemplary combined performance table 700 with virtual channel performance violations highlighted (e.g., circled). As shown in FIG. 10, packet loss measurement PL2 for VC 106 at time period T2 did not meet performance criteria. In addition, packet loss measurement PL3 for VC 106 at time period T3 did not meet performance criteria, and the packet loss measurement PL4 for VC 106 at time period T4 did not meet performance criteria. In these three instances, packet loss measurements PL2, PL3, and PL4 may have been greater than the criterion PL' stored in performance criteria table 800 (e.g., in VC performance criteria field 806).

Because the performance criteria stored in VC performance criteria field 806 may be derived from an SLA, the virtual channel performance violations may also be referred to as virtual channel "SLA violations." Thus, as shown in FIG. 10, there were virtual channel SLA violations at time T2, T3, and T4. The remaining blocks described below may attribute fault of the SLA violations to CPE 102 or transport network 104, for example.

The ingress interface performance violations corresponding to the virtual channel performance violations may be identified (block 913). Report server 214 may identify instances where an ingress interface did not meet performance criteria set for that ingress interface. Report server 214 may identify ingress interface performance violations by comparing ingress IF performance field 708 of combined performance table 700 to ingress IF performance criteria field 808 of performance criteria table 800. As shown in FIG. 10, packet loss measurement PLB2 for VC 106 at time period T2 did not meet performance criteria. In addition, packet loss measurement PLA4 for VC 106 at time period T4 did not meet performance criteria. In these two instances, packet loss measurements PLB2 and PLA4 may have been greater than the criteria PLB' and PLA' stored in performance criteria table 800 (e.g., in ingress IF performance criteria field 808).

The ingress interface violations may be a result of CPE 102 attempting to transmit at a higher data rate than provisioned for VC 106, the provisioning of which may have been derived from an SLA. Thus, as shown in FIG. 10, at times T2 and T4, CPE 102 may have been attempting to transmit at a data rate greater than that provisioned for VC 106.

VC 106 not meeting the performance criteria at time T2 (measurement PL2) corresponds with an ingress interface not meeting performance criteria (measurement PLB2). Thus, the SLA violation at time period T2 may have been caused by the customer equipment, such as CPE 102-2, transmitting too much data traffic (e.g., packet's) over an ingress interface (e.g., the second ingress interface) at that time.

In addition, VC 106 not meeting the performance criteria at time T4 (measurement PL4) corresponds with an ingress interface not meeting performance criteria (measurement PLA4). Thus, the SLA violation at time period T2 may have been caused by the customer equipment, such as CPE 102-1, transmitting too much data traffic (e.g., packets) over an ingress interface (e.g., first ingress interface) at that time.

The internal interface performance violations corresponding to the virtual channel performance violations may be identified (block 915 ). Report server 214 may identify instances where an internal interface did not meet performance criteria set for that ingress interface. Report server 214 may identify internal interface performance violations by comparing internal IF performance field 710 of combined performance table 700 to internal IF performance criteria field 810 of performance criteria table 800. As shown in FIG. 10, packet loss measurement PL13 for VC 106 at time period T3 did not meet performance criteria. In addition, packet loss measurement PLN4 for VC 106 at time period T4 did not meet performance criteria. In these two instances, packet loss measurements PL13 and PLN4 may have been greater than the criteria PL1' and PLN' stored in performance criteria table 800.

Because the performance criteria stored in internal IF performance criteria field 810 may be derived from the known characteristics of network devices 202, the internal interface violations may be a result network devices 202, for example, being overloaded. Thus, as shown in FIG. 10, network devices 202 may have been overloaded, for example, at times T3 and T4.

VC 106 not meeting performance criteria at time T3 (measurement PL3) corresponds with the an internal interface not meeting performance criteria (measurement PL13). Thus, VC 106 not meeting performance criteria at time period T3 may have been caused by a network device, such as network device 202-2, handling too much data traffic (e.g., packets).

in addition, VC 106 not meeting performance criteria at time T4 (measurement PL4) corresponds with the Nth internal interface not meeting performance criteria (measurement PLN4). Thus, VC 106 not meeting its performance criteria at time period 14 may have been caused by a network device, such as network device 202-4, handling too much data traffic (e.g., packets).

As shown, the violation of performance of VC 106 at time T4 may have been caused by either the customer equipment (e.g., CPE 102) or the service provider (e.g., transport network 104) because the violation at time period T4 corresponds with a violation of an ingress interface performance (measurement PLA4) and a violation of an internal interface performance (measurement PLN4).

On the other hand, the violation of performance criteria of VC 106 at time T2 appears to have been caused by excess data traffic (e.g., packets) from CPE 102 (e.g., measurement PLB2). Further, the violation of performance criteria of VC 106 at time T3 appears to have been caused by the overload of network devices 202 in transport network 104 (e.g., measurement PL13) and not CPE 102.

Reports may be generated (block 917). Report server 214 may generate reports indicating when one or more virtual channels, such as VC 106, do not meet performance criteria. In other words, report server 214 may generate reports indicating when a virtual channel SLA was violated. Report server 214 may also generate reports indicating when the virtual channel SLA violation was likely caused by customer equipment (e.g., CPE 102 transmitting too much data traffic).

Report server 214 may also generate reports indicating when the virtual channel SLA violation was likely caused by the service provider equipment (e.g., network devices 202 in transport network 104, not CPE 102).

FIGS. 11A, 11B, and 11C are block diagrams of exemplary performance reports 1100A, 1100B, and 1100C, respectively. Performance report 1100A lists virtual channel SLA violations likely caused by end-point equipment (e.g., the violation at time period T2 likely caused by CPE 102). Performance report 1100B lists virtual channel SLA violations likely caused by transport network 104 (e.g., the service provider). Performance report 1100C lists virtual channel SLA violations where the equipment at fault May not be immediately identified, but may require further analysis (e.g., the violation at time period T4). In one embodiment, report server 214 may automatically and continuously combine performance reports from NMS 212 and VC monitor 210 and generate reports identifying virtual channel SLA violations and the party at fault, for example.

While a series of blocks has been described above, such as with respect to FIG. 9, the order of the blocks may differ in other implementations. Moreover, non-dependent blocks may be implemented in parallel. For example, blocks 903, 905, and 907 may be implemented in parallel, as many of the measurements by VC monitor 210 and NMS 212 may take place during the same time periods (e.g., time period T1, T2, T3, or T4).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   measuring a performance of a virtual channel carrying packets through a transport network, wherein the packets originate from end-point equipment not forming part of the transport network;
   measuring a performance of an ingress interface to the transport network receiving the virtual channel packets;
   measuring a performance of an internal interface carrying the virtual channel packets internal to the transport network;
   determining whether the performance of the virtual channel meets a first performance criterion;
   determining whether the performance of the ingress interface meets a second performance criterion;
   determining whether the performance of the internal interface meets a third performance criterion; and
   identifying instances where the performance of the virtual channel has been determined not to meet the first performance criterion, and the performance of the ingress interface has been determined not to meet the second performance criterion as performance violations caused by the end-point equipment.

2. The computer-implemented method of claim 1, further comprising:
   identifying instances where the performance of the virtual channel has been determined not to meet the first performance criterion and the performance of the internal interface has been determined not to meet the third performance criterion as performance violations caused by the transport network.

3. The computer-implemented method of claim 2, further comprising:
   measuring the performance of the virtual channel carrying the packets over the transport network for a plurality of time periods;
   measuring the performance of the ingress interface to the transport network receiving the virtual channel packets for the plurality of time periods; and
   identifying a first instance where, during any one of the plurality of time periods, the performance of the virtual channel has been determined not to meet the first performance criterion and the performance of the ingress interface has been determined not to meet the second performance criterion, and identifying the first instance as a performance violation caused by the end-point equipment.

4. The computer-implemented method of claim 3, further comprising:
   measuring the performance of the internal interface carrying the virtual channel packets internal to the transport network for the plurality of time periods; and
   identifying a second instance where, during any one of the plurality of time periods, the performance of the virtual channel has been determined not to meet the first performance criterion and the performance of the internal interface has been determined not to meet the third performance criterion, and identifying the second instance as a performance violation caused by the transport network.

5. The computer-implemented method of claim 1, wherein measuring the performance of the virtual channel carrying packets through the transport network includes injecting packets into the virtual channel, wherein the packets do not originate from the end-point equipment.

6. The computer-implemented method of claim 5, wherein injecting packets into the virtual channel includes injecting packets into the virtual channel near a first end of the virtual channel.

7. The computer-implemented method of claim 6, wherein the method further comprises receiving the injected packets from the virtual channel near a second end of the virtual channel.

8. The computer-implemented method of claim 1,
wherein measuring the performance of the virtual channel includes measuring at least one of latency, packet loss, or jitter of the virtual channel;
wherein measuring the performance of the ingress interface includes measuring packet loss; and
wherein determining whether the performance of the ingress interface meets the second performance criterion includes determining whether the measured packet loss exceeds a threshold.

9. A system comprising:
network devices forming a transport network for carrying packets through a virtual channel, wherein one of the network devices includes an ingress interface to receive the packets from end-point equipment coupled to the transport network, and wherein one of the network devices includes an internal interface to receive the packets from another one of the network devices forming part of the transport network;
a transmitter to inject packets into the virtual channel to measure a performance of the virtual channel;
a receiver to receive the injected packets from the virtual channel to measure the performance of the virtual channel; and
a processor to:
measure the performance of the virtual channel, a performance of the ingress interface, and a performance of the internal interface;
determine whether the performance of the virtual channel meets a first criterion, whether the performance of the ingress interface meets a second criterion, and whether the performance of the internal interface meets a third criterion; and
identify instances where the performance of the virtual channel has been determined not to meet the first performance criterion, and the performance of the internal interface has been determined not to meet the third criterion as performance violations caused by the transport network.

10. The system of claim 9,
wherein the processor is configured to identify instances where the performance of the virtual channel has been determined not to meet the first performance criterion, and the performance of the ingress interface has been determined not to meet the second performance criterion as performance violations caused by the end-point equipment.

11. The system of claim 10, wherein the transmitter injects packets into the virtual channel near a first end of the virtual channel.

12. The system of claim 11, wherein the receiver receives the injected packets from the virtual channel near a second end of the virtual channel.

13. The system of claim 12, wherein the performance of the virtual channel includes at least one of latency, packet loss, or jitter of the virtual channel.

14. The system of claim 13, wherein the performance of the ingress interface includes packet loss and the performance of the internal interface includes packet loss.

15. A computer-implemented method comprising:
transporting packets through a transport network via a virtual channel, wherein the packets originate from end-point equipment not forming part of the transport network;
measuring a performance of an ingress interface to the transport network receiving the packets during a plurality of time periods;
measuring a performance of an internal interface to the transport network carrying the packets internal to the transport network during the plurality of time periods;
determining whether the performance of the ingress interface meets a first performance criterion during the plurality of time periods;
determining whether the performance of the internal interface meets a second performance criterion during the plurality of time periods;
identifying one or more of the plurality of time periods in which the performance of the ingress interface has been determined not to meet the first performance criterion as time periods in which a virtual channel performance violation is caused by the end-point equipment; and
identifying one or more of the plurality of time periods in which the internal interface has been determined not to meet the second performance criterion as time periods in which a virtual channel performance violation is caused by the transport network.

16. The computer-implemented method of claim 15, further comprising:
measuring a performance of the virtual channel carrying the packets through the transport network during the plurality of time periods;
determining whether the performance of the virtual channel meets a third performance criterion during the plurality of time periods; and
identifying one or more of the plurality of time periods in which the performance of the virtual channel has been determined not to meet the third performance criterion as virtual channel performance violations.

17. The computer-implemented method of claim 16,
wherein measuring the performance of the virtual channel includes measuring at least one of latency, packet loss, or jitter of the virtual channel;
wherein measuring the performance of the ingress interface includes measuring packet loss; and
wherein measuring the performance of the internal interface includes measuring packet loss.

18. The computer-implemented method of claim 16, wherein measuring the performance of the virtual channel includes injecting additional packets into the virtual channel, wherein the additional packets do not originate from the end-point equipment.

19. The computer-implemented method of claim 18, wherein injecting additional packets into the virtual channel includes injecting the additional packets into the virtual channel near a first end of the virtual channel.

20. The computer-implemented method of claim 19, wherein measuring the performance of the virtual channel includes receiving the additional packets from the virtual channel near a second end of the virtual channel.

* * * * *